Aug. 14, 1951
J. TELASCO
2,564,616
SLIDE RULE
Filed Nov. 16, 1946
3 Sheets-Sheet 1
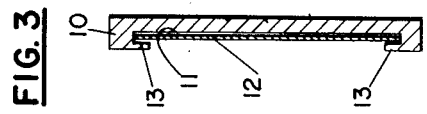
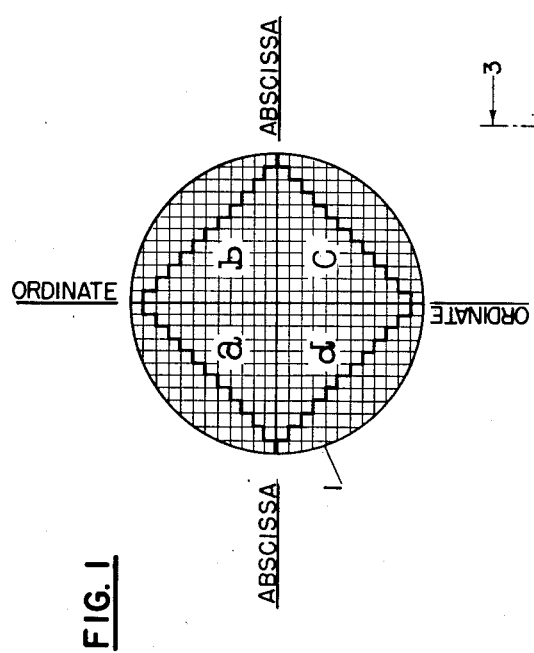
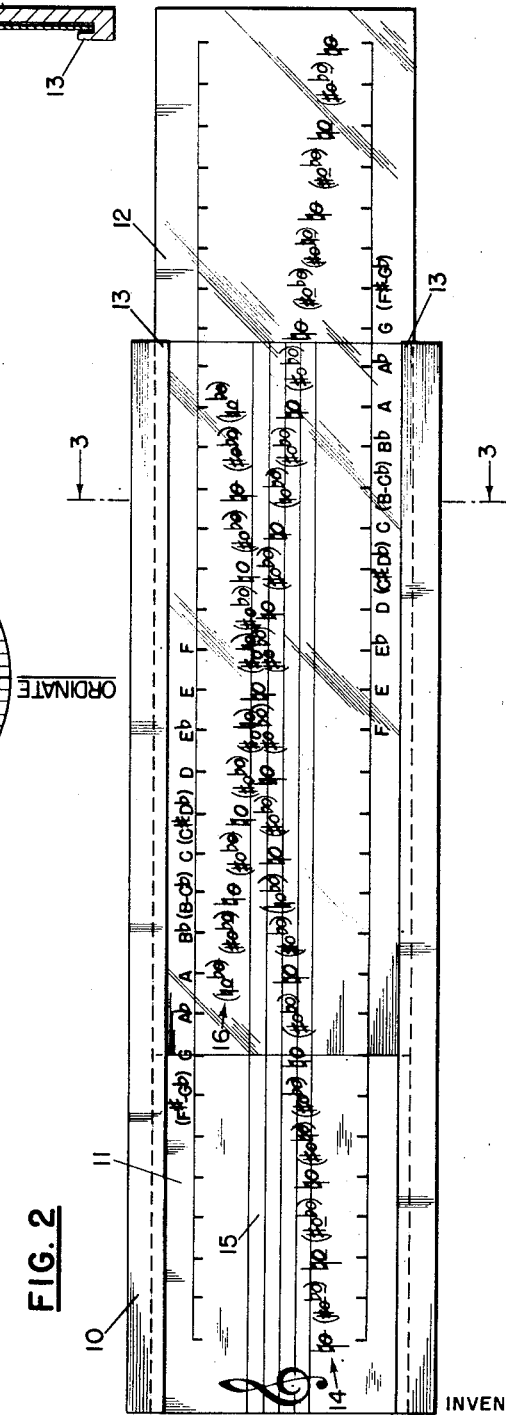
INVENTOR
JOSEPH TELASCO
BY
ATTORNEYS Aug. 14, 1951  J. TELASCO  2,564,616
SLIDE RULE
Filed Nov. 16, 1946
3 Sheets-Sheet 2
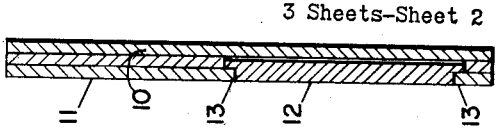
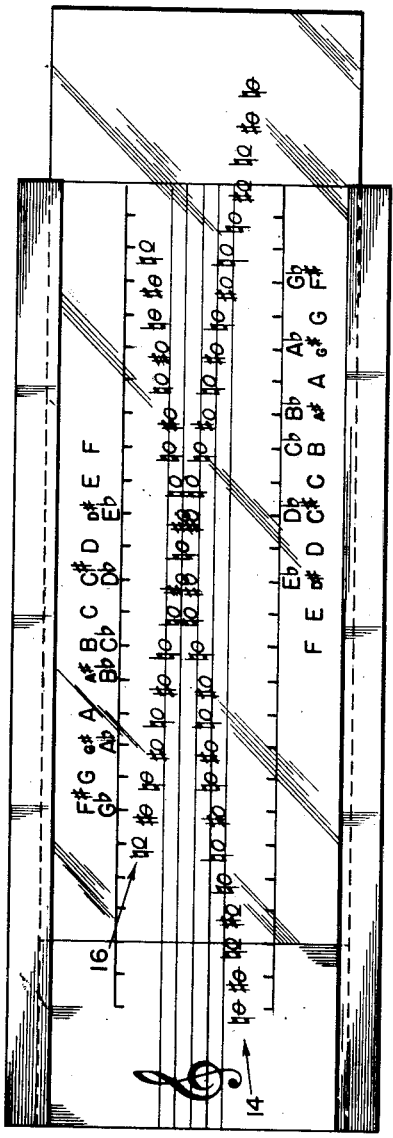
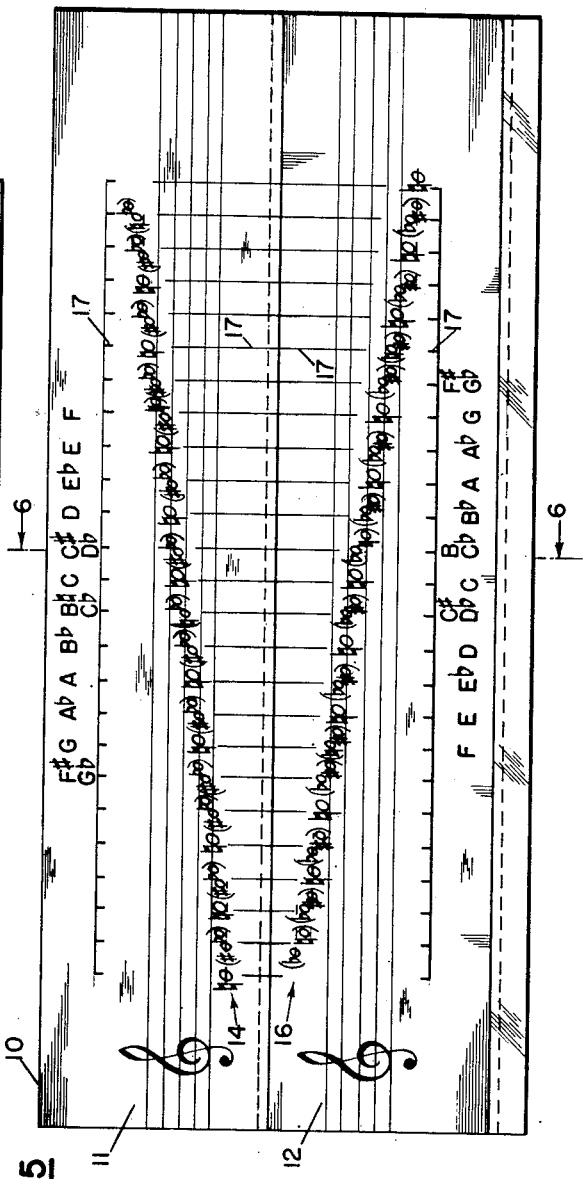
INVENTOR
JOSEPH TELASCO
BY
ATTORNEYS Aug. 14, 1951  J. TELASCO  2,564,616
SLIDE RULE
Filed Nov. 16, 1946  3 Sheets-Sheet 3

INVENTOR
JOSEPH TELASCO
BY
ATTORNEYS

Patented Aug. 14, 1951

2,564,616

UNITED STATES PATENT OFFICE 2,564,616

SLIDE RULE

Joseph Telasco, New York, N. Y.

Application November 16, 1946, Serial No. 710,259

1 Claim. (Cl. 84—473)

This invention relates to slide rules and contemplates a novel slide rule for use in geometrical inversion of music.

Geometrical inversion of music has been brought to light and effectively utilized in the Schillinger System of Musical Composition. In accordance with this system, it has been found helpful to visualize music by expressing it graphically in rectangular projection on a plane surface. In such graphical representation of music, tonal values are represented by vertical displacement along the vertical or "ordinate" axis, and time intervals are represented by horizontal displacement along the horizontal or "abscissa" axis. It is the general practice to consider each vertical graphical unit as representing a semitone and to consider each horizontal graphical unit as representing a convenient unit of tone duration such, for example, as an eighth note.

Pursuant to this graphical representation, the musical notation is subject to rotation or inversion of the plane of projection through three-dimentional space. For example, it is the convention to represent the graphical form of the original musical sequence in the upper left ("a") quadrant of a plane figure such as that shown in Fig. 1 of the drawings. The graphical form illustrated in quadrant "a" of Fig. 1 represents an ascending chromatic scale of uniform note duration. The "a" (or original) form of the musical sequence may be geometrically inverted by rotating it about the vertical or ordinate axis. The graphical form then appears in the upper right ("b") quadrant and comprises the same sequence of notes to reverse order. Both the "a" and "b" forms may be inverted geometrically about the horizontal or abscissa axis. The horizontally inverted "b" form is denoted as the "c" form and the horizontally inverted "a" form is identified as the "d" form.

Geometrical inversion of a musical sequence about the vertical axis involves no change in tonal value between the "a" and "b" forms or between the "d" and "c" forms. The same tonal values are retained and are merely arranged in the reverse sequential order. Geometrical inversion about the horizontal axis involves an inversion about a tonal axis and thus results in a change of all tonal values except that of the tonal axis itself. The tonal axis is known as the pitch axis. Translation into standard musical notation of the graphical form of the musical sequence inverted about a pitch axis is complicated by the fact that the tonal difference between a line of the staff and an adjacent space in the staff of conventional musical notation is sometimes a half tone and sometimes a full tone. Accordingly, in actual use of the Schillinger system for geometrical inversion of a musical sequence about a pitch axis it has been standard procedure to translate the inverted graphical form into conventional musical notation by counting on one's fingers the number of half tones each note of the form is displaced from the pitch axis and then placing this note at its appropriate position on a conventional staff. Charts also have been prepared for geometrically inverting music about a pitch axis, a separate chart being required for each of the twelve possible pitch axes (the twelve different tonal values of a chromatic scale). Such methods of effecting inversion of music about a pitch axis are cumbersome and have led to frequent mistakes, particularly where the inversion is effected about a frequently changing pitch axis comprising the root of the harmonic chord for each portion of the musical sequence.

The present invention contemplates a novel slide rule for use in geometrically inverting a musical sequence about all possible pitch axes. The slide rule of the invention is provided with two relatively movable scale surfaces, an ascending chromatic musical scale being arranged on one of the surfaces and a descending chromatic musical scale being arranged on the other scale surface. By aligning any note represented on one of the scales with the corresponding note represented on the other scale, the notes which are aligned representing the tonal value of the selected pitch axis, the portions of the two scales on any one side of the pitch axis represent geometric inversions of one another about the selected pitch axis. In a now-preferred embodiment of the invention, the chromatic scales are represented by notes on a staff, although the notes may be represented merely by the conventional letter used to designate a musical scale. In accordance with the invention, one of the scale surfaces bearing such a scale is transparent and is superimposed on the other scale surface, although both scales may be opaque and placed in juxtaposition.

These and other novel features of the invention will be more fully understood from the following description taken in conjunction with the drawings in which, in addition to Fig. 1 previously referred to, Fig. 2 is a plan view of a bar-type slide rule of the invention having one scale surface superimposed on the other;

Fig. 3 is a sectional view taken along line 3—3 in Fig. 2;

Fig. 4 is a plan view of another modification of scale markings on one scale surface superimposed on another scale surface;

Fig. 5 is a plan view of two scale surfaces disposed in juxtaposition with respect to one another;

Fig. 6 is a sectional view taken along line 6—6 in Fig. 5;

Figure 7:
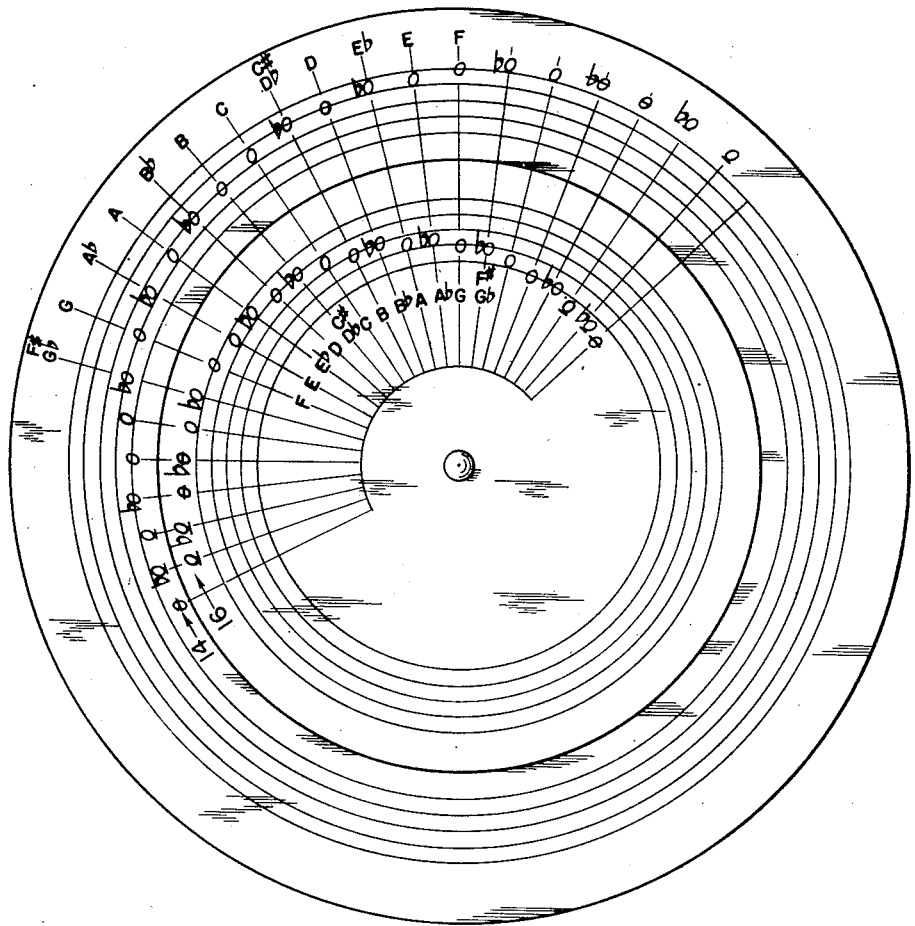
Fig. 7 is a plan view of a circular slide rule in accordance with the invention.

The slide rule shown in Figs. 2 and 3 comprises a base member 10 bearing a scale surface 11. A second scale surface 12 of substantially transparent material is supermiposed over the other scale surface and is held in position by longitudinal shoulders 13 formed in the base member 10. The transparent scale surface 12 is free to slide longitudinally over the fixed scale surface 11 so as to provide relative movement of one scale surface with respect to the other. An ascending chromatic musical scale 14 of uniformly spaced notes is arranged on a conventional staff 15 on the fixed scale surface 11 and a descending chromatic musical scale 16 of similarly spaced notes is arranged on the transparent scale surface 12. It should be noted, however, that it is immaterial which scale surface bears the ascending or descending musical scale. The transparent scale surface need not bear its own staff inasmuch as the staff on the lower scale surface 11 can be clearly seen through the transparent scale surface 12.

As shown in Fig. 2, the natural notes appear singly and the notes which may be designated either as sharped or flatted notes are advantageously grouped in pairs representing the two established designations of the same tonal value. For example, on the ascending scale 14, the first note is "C natural" and the next semitone above "C" is represented by a pair of notes designated "C sharp" and "D flat." The next semitone is "D natural." This is followed by another pair of notes having a single tonal value but designated as "D sharp" and "E flat." "E natural" is represented as a single note and "F natural" may be represented as a single note or advantageously as a pair of notes designated "E sharp" and "F natural." "B natural," like "F natural," may be represented by a single note or advantageously as a pair of notes designated "B natural" and "C flat." The us of pairs of notes where the same tonal value may be designated as either of two differently written notes facilitates alignment of the two relatively movable scale surfaces on any desired tonal value comprising the pitch axis inasmuch as the corresponding notes on both scales appear in identical positions on the staff.

Each chromatic scale advantageously comprises a sequence of twenty-four tonal values, that is, two octaves. Scales of this length insure a full half-octave of tonal values on both the ascending and descending scales on each side of any pitch axis falling within the intermediate portion of both scales. The combination of the two cooperating half-octaves on both scales covers a full octave of chromatic scales diverging from the pitch axis and thus represents the geometrical inversion of all tonal values about the pitch axis. Although the ascending and descending scales shown in the drawings start and end on "C," it must be understood that the chromatic scales may start and end on any other note or notes.

In order to insure selection of a pitch axis falling within the intermediate portion of both scales, each scale may be provided with lettering denoting each of the notes of one octave located within the intermediate portion of each scale. Thus, in the case of a two-octave ascending and descending chromatic scale starting and ending on "low C," the intermediate portion of each scale comprises the twelve consecutive notes centered about "middle C." The lettering also facilitates alignment of the two scales on the desired pitch axis.

Each of the tonal values in the scale may be represented as a single note, as shown in Fig. 4, rather than as a series of single notes and pairs of notes as shown in Fig. 2. Where each of the tonal values is represented by a single note, it is advantageous to represent these notes as either "naturals" and "sharps" (as in Fig. 4) or "naturals" and "flats" (as in Fig. 7). By avoiding the use of two scales each consisting of single notes where sharps are used in one scale and flats are used in the other, there is avoided the confusion which might arise by the attempted alignment of the same tonal value in both scales where this value is represented as a sharp (say "C sharp") on one scale and as a flat (say "D flat") on the other scale.

Although it is particularly advantageous to have one scale superimposed over the other scale in the slide rule of the present invention, either in a bar-type or disc-type slide rule, the two scales on their respective scale surfaces may be placed in juxtaposition as shown in Fig. 5. Each chromatic scale is then arranged on its own staff. The two scale surfaces 11 and 12 may be placed in juxtaposition in the form of a bar slide rule as shown in Figs. 5 and 6 or in the form of a disc-type (circular) slide rule as shown in Fig. 7. Where the two scale surfaces are merely in juxtaposition and not superimposed, it is particularly advantageous to provide both scale surfaces with appropriate transverse markings 17, as shown in Fig. 5, to facilitate alignment of the two scales about the desired pitch axis.

In order to use the slide rule of the invention, the pitch axis for each note of the musical sequence to be inverted must be ascertained. Although a single pitch axis such as the key signature may be maintained throughout the complete inversion of the musical sequence, it is generally the practice to select as the pitch axis for any note, whether in the melody or in the harmony, the root of the harmonic chord (i. e. the note of the chord name) for that portion of the musical sequence which includes the note in question. For example, if the first note of the musical sequence is accompanied by a harmonic chord based on "E" (say, the "E" tonic chord) the pitch axis for this first note of the sequence should be "E." Accordingly, one scale surface of the slide rule is moved with respect to the other scale surface until the "E" within the intermediate portion of one scale is aligned with the "E" within the intermediate portion of the other scale, as shown in Fig. 2. If the tonal value of this first note of the musical sequence lies above the pitch axis "E," its geometrically inverted position will be below the pitch axis. Conversely, if the tonal value of the note to be inverted lies below the pitch axis, its geometrically inverted position will be above the tonal value of the pitch axis. For example, if this first note of the sequence is "G sharp" above the pitch axis ("E"), its geometrically inverted form will be determined by locating this "G sharp" above the pitch axis on one of the scale surfaces and transforming it to the tonal value of the note aligned with it on the other scale surface, "C natural" in this specific example. The geometrically inverted note may be shifted an octave without departing from the effect of the geometrical inversion. Other consecutive notes in the musical sequence are similarly inverted geometrically about the same pitch axis as long as the root of the harmonic chord for these notes in the sequence remains the same. When the root of the harmony changes in the course of the musical sequence, the slide rule must be readjusted to the new pitch.

Figure 8:
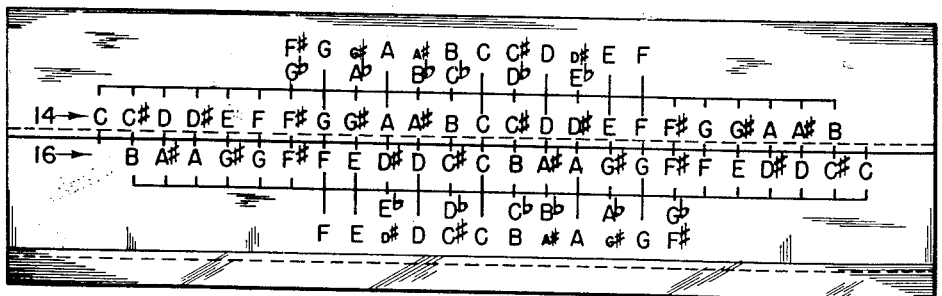
Fig. 8 is a plan view of a slide rule bearing musical scales in accordance with the invention, the scales being represented by alphabetical notation.

As mentioned heretofore the musical scales on a slide rule in accordance with the invention may be composed of the letters conventionally used to designate the notes of a scale. Such scales are shown in the slide rule of Fig. 8. It will be seen that the scales 14 and 16 of this rule comprise an ascending and a descending chromatic scale represented by "naturals" and "sharps" and are thus the equivalent of the scales shown in Fig. 4. However, in this embodiment of the invention the two scales are placed upon scale surfaces which are arranged in juxtaposition as in Fig. 5. The scale surfaces are advantageously also provided with further lettering denoting each of the notes of one octave located within the intermediate portion of each scale.

It will be seen, accordingly, that the novel slide rule of the invention makes it possible to invert a musical sequence geometrically about all pitch axes involved in this sequence with a minimum of effort and in much shorter time than has been possible heretofore. The slide rule offers a visual picture of the geometrical inversion afforded heretofore only in the form of charts. The slide rule is a material improvement over the charts of the prior art in that it provides immediate visualization of such geometrical inversion about any desired pitch axis. Furthermore, the slide rule of the invention may be held and manipulated in one hand, thus leaving one's other hand free to write the musical sequence in its geometrically inverted form.

I claim:

In a slide rule having two relatively movable scale surfaces, an ascending chromatic musical scale composed of notes representing successive ascending half-tones arranged on one of the surfaces and a descending chromatic musical scale composed of notes representing successive descending half-tones arranged on the other scale surface in cooperative relationship to the first-mentioned scale, each scale being of such length that when any note within the intermediate portion of one scale is aligned with the corresponding note of the other scale an ascending and a descending chromatic scale of at least one octave in range are centered about said aligned notes.

JOSEPH TELASCO.

REFERENCES CITED

The following references are of record in the file of this patent:

UNITED STATES PATENTS

| Number | Name | Date |
|---|---|---|
| 535,375 | Hill | Mar. 12, 1895 |
| 1,364,154 | Stillman et al. | Jan. 4, 1921 |

FOREIGN PATENTS

| Number | Country | Date |
|---|---|---|
| 7,219 | Great Britain | Mar. 25, 1912 |
| 437,709 | France | Apr. 29, 1912 |

OTHER REFERENCES

Engineering Bulletin, Purdue University, vol. XVII, No. 5, September 1933, page 7, Figure 3.